United States Patent [19]

Kraus et al.

[11] 4,137,381

[45] Jan. 30, 1979

[54] FINELY DISTRIBUTED POLYVINYL CHLORIDE MOLDING COMPOSITIONS CAPABLE OF BEING SINTERED

[75] Inventors: Helmut Kraus, Burghausen, Salzach; Heinz Müller, Burgkirchen, Alz; Hans Huber, Burgkirchen, Alz; Kasimir Ruchlak, Burgkirchen, Alz, all of Fed. Rep. of Germany

[73] Assignee: Hoechst Aktiengesellschaft, Frankfurt am Main, Fed. Rep. of Germany

[21] Appl. No.: 842,809

[22] Filed: Oct. 17, 1977

[30] Foreign Application Priority Data

Oct. 15, 1976 [DE] Fed. Rep. of Germany ....... 2646595

[51] Int. Cl.$^2$ .............................................. C08K 5/42
[52] U.S. Cl. ..................................... 526/3; 526/344.3
[58] Field of Search ................. 526/3, 220, 225, 344.2, 526/344.3, 345; 260/501.19, 501.21

[56] References Cited

U.S. PATENT DOCUMENTS

| | | | |
|---|---|---|---|
| 2,236,515 | 4/1941 | Cahn | 260/501.21 |
| 2,778,814 | 1/1957 | Behrens | 260/501.19 |
| 3,068,211 | 12/1962 | Deanin | 526/225 |
| 3,706,705 | 12/1972 | Koyanagi | 526/344.2 |
| 3,865,799 | 2/1975 | Katagiri | 526/344.3 |
| 3,895,000 | 7/1975 | Mathieu | 526/344.2 |
| 3,925,442 | 12/1975 | Samour | 526/225 |
| 3,950,318 | 4/1976 | Park | 526/345 |
| 3,951,883 | 4/1976 | Ruchlak | 526/225 |
| 3,975,338 | 8/1976 | Tsubota | 526/225 |

*Primary Examiner*—Paul R. Michl
*Attorney, Agent, or Firm*—Connolly & Hutz

[57] ABSTRACT

Powdery molding compositions capable of being sintered made from polyvinyl chloride, which are especially suitable for the manufacture of separator plates for electric cells, and which substantially consist of a suspension polyvinyl chloride, from 0.003 to 0.45 weight %, relative to the molding composition, of free sulfonic acids selected from the group of alkylarylsulfonic acids and/or alkylsulfonic acids, and 1/9 to 7/3 of said 0.003 to 0.45 weight % of anions of said sulfonic acids, in the form of their salts with organic cations, selected from the group of quaternary ammonium cations.

8 Claims, No Drawings

FINELY DISTRIBUTED POLYVINYL CHLORIDE MOLDING COMPOSITIONS CAPABLE OF BEING SINTERED

The present invention relates to molding compositions capable of being sintered, made from suspension polyvinyl chloride, a process for the manufacture thereof, and a process for the manufacture of sintered porous molded articles, especially of separator plates for electric cells by sintering said molding compositions.

It is known that polyvinyl chloride may be used for the manufacture of separator plates for electric cells. In a first stage, it has been tried to use products prepared from vinyl chloride according to the usual processes of suspension polymerization. However, these polymers have generally a too large mean grain size, which results in sintered plates having very large pores. But even a finely distributed suspension polyviynl chloride has the disadvantage of insufficient wettability which hinders the passage of the electrolyte through the separator plate.

It is known that, in order to solve this problem, the suspension polymerization of vinyl chloride is carried out in the presence of small amounts of emulsifiers such as they are used for the emulsion polymerization of vinyl chloride, for example sodium salts of alkylbenzenesulfonic acids, alkylsulfuric acids or sulfonated dialkylsuccinic acid esters, the polymers so obtained are mixed with emulsion polyvinyl chloride, and small amounts of a nonionic antistatic agent are added. Thus, the wettability is improved, but the mechanical properties of the sintered plates are deteriorated. Moreover, because of the relatively high content of surfactants, especially the emulsifier(s), separator plates so manufactured tend to foaming in the electric cell.

These disadvantage are overcome by another known process in which the suspension polymerization is carried out in the presence of certain free sulfonic acids instead of the sodium salts of these acids generally employed for the emulsion polymerization, and in the presence of nonionic wetting agents. Without mixing with emulsion PVC, the product obtained yields sintered plates having good wettability and mechanical properties; however, it is not entirely satisfactory, since the thermostability is decreased, the flow properties of the powder are insufficient, dosage on the plate sintering machines is difficult and, on prolonged processing times, corrosion occurs on the machine parts.

A molding composition has now been found which is free from the above disadvantages. This finely distributed molding composition of suspension polyvinyl chloride capable of being sintered having a K value of from 60 to 75, an apparent density of from 350 to 500 g/l, a plastifier uptake of from 12 to 25 weight %, a mean grain size of from 15 to 35 $\mu$m, a grain size distribution of from 60 to 98 weight % smaller than 33 $\mu$m
2 to 35 weight % from 33 to 63 $\mu$m.
0 to 4.5 weight % from 63 to 125 $\mu$m
0 to 0.5 weight % greater than 125 $\mu$m, prepared by suspension polymerization of vinyl chloride in aqueous phase by means of oil-soluble activators, in the presence of at least one suspension stabilizer and from 0.01 to 0.5 weight %, relative to monomer vinyl chloride of at least one alkylarylsulfonic acid having from 3 to 16 carbon atoms in the alkyl chain, or of at least one alkylsulfonic acid having from 8 to 16 carbon atoms, or mixtures of the cited sulfonic acids, whereby a further amount of at least one of these sulfonic acids may be added to the polymer obtained after its separation from the polymerization mixture, comprises (a) from 0.003 to 0.45 weight % (relative to the total molding composition) of at least one of the said sulfonic acids, and (b) from 1/9 to 7/3 of the amount cited sub a) of at least one anion of the said sulfonic acids in the form of their salts with at least one organic cation having a total number of from 6 to 60 carbon atoms, and corresponding to the following formula

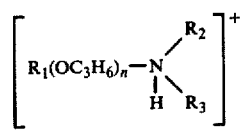

wherein $R_1$ is a linear, branched or cyclic, saturated or unsaturated alkyl radical or arylalkyl radical having from 6 to 22 carbon atoms; $n$ is 0 or 1; $R_2$ and $R_3$, being identical or different, each are hydrogen, a linear, branched or cyclic, saturated or unsaturated alkyl or aralkyl radical having from 1 to 22 carbon atoms, a radical of the formula

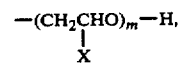

wherein X is H or $CH_3$ and $m$ an integer of from 1 to 20; or $R_2$ or $R_3$ is a radical of the formula $-C_3H_6O-R_1$, wherein $R_1$ is as defined above.

Preferably, the molding composition contains from 0.01 to 0.45 weight %, and especially from 0.05 to 0.4 weight % (relative to the total molding composition) of the free sulfonic acids, and from 1/9 to 7/3 of this amount of anions of the sulfonic acids in the form of their salts with the above cations.

Subject of the present invention is furthermore a process for the manufacture of a finely distributed polyvinyl chloride molding composition capable of being sintered by suspension polymerization of vinyl chloride in aqueous phase by means of oil-soluble activators, in the presence of at least one suspension stabilizer and from 0.01 to 0.5 weight %, relative to monomer vinyl chloride, of at least one alkylarylsulfonic acid having from 3 to 16 carbon atoms in the alkyl chain, or of at least one alkylsulfonic acid having from 8 to 16 carbon atoms, or mixtures of the cited sulfonic acids, whereby a further amount of at least one of these sulfonic acids may be added to the polymer obtained after its separation from the polymerization mixture, which comprises adding after the polymerization, in the presence or absence of solvents, from 10 to 70 equivalent weight %, relative to the acid amount acidimetrically determined before the addition, of at least one compound having a total number of from 6 to 60 carbon atoms and corresponding to the following formula

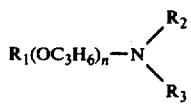

wherein $R_1$ through $R_3$ and $n$ are as defined above.

Subject of the present invention is furthermore a process which comprises sintering the finely distribution molding compositions capable of being sintered made from polyvinyl chloride for the manufacture of sintered porous plastic molded articles, especially separator plates for electric cells.

The suspension polymerization of vinyl chloride in aqueous phase by means of at least one oil-soluble activator in the presence of at least one suspension stabilizer and at least one free alkylaryl- or alkylsulfonic acid as emulsifier is carried out according to German Offenlegungsschrift No. 2,310,431; polymer preparation in accordance with this invention being possible, alternatively in the absence of an nonionic wetting agent.

Said Offenlegunggschrift describes a process for the manufacture of a pulverulent polyvinyl chloride molding composition capable of being sintered by suspension polymerization of vinyl chloride in aqueous phase using an oil-soluble activator, in the presence of a suspension stabilizer, a nonionic wetting agent and an emulsifier, with separation and drying of the polymer, which comprises using as emulsifier an alkylarylsulfonic acid having from 3 to 16 carbon atoms in the alkyl chain or an alkylsulfonic acid having from 8 to 16 carbon atoms, or a mixture of the said sulfonic acids, in an amount of from 0.01 to 0.5% by weight, calculated on monomeric vinyl chloride.

Suitable alkylarylsulfonic acids are dialkylsulfonic acids, for example of naphthalene or benzene, preferably, however, monoalkylarylsulfonic acids, particularly the monoalkylbenzene-sulfonic acids. The alkyl groups contain from 3 to 16, preferably from 8 to 14, and more preferably from 10 to 12 carbon atoms in a branched or straight chain, preferably in a straight chain. Sulfonic acids of this type are, for example, dodecyl- and nonyl-benzene-sulfonic acids, diisobutyl-, diisopropyl-, and di-tert. butyl-naphthalene-sulfonic acids. The alkylsulfonic acids have from 8 to 16 and preferably 12 to 14 carbon atoms.

The sulfonic acids are used either in pure form or in the form of mixtures with one another. The alkylarylsulfonic acids are obtained especially by direct sulfonation of the corresponding alkylbenzenes or mixtures of said alkylbenzenes with $SO_3$ or oleum. The alkylsulfonic acids can be prepared, for example by sulfoxidation with $SO_2/O_2$ of corresponding crude oil or paraffin fractions. The sulfonic acids are used in an amount of from 0.01 to 0.5% by weight, preferably 0.08 to 0.3% by weight, calculated on monomeric vinyl chloride.

Suitable polymerization initiators or activators are the usual oil soluble compounds, for example lauroyl peroxide, diisopropyl-peroxydicarbonate, or cyclohexyl-sulfonylacetyl-peroxide.

The polymerization is carried out in the presence of suitable known suspension stabilizers, such as alkyl or hydroxyalkyl celluloses, for example methyl or ethyl cellulose, hydroxyethyl or hydroxypropyl cellulose, or the mixed ethers thereof, for example hydroxypropyl-methyl cellulose. Other suspension stabilizers may also be used, for example polyvinyl alcohol or partially saponified polyvinyl esters. The suspension stabilizers are added to the polymerization mixture in an amount of from 0.05 to 0.8% by weight, perferably 0.1 to 0.5% by weight, calculated on monomeric vinyl chloride. The added suspension stabilizers should have a viscosity of from 200 to 700 centipoises, preferably 300 to 500 centipoises, calculated on a 2% by weight solution at 20° C.

The non-ionic wetting agent is used in an amount of from 0.01 to 0.1% by weight, preferably 0.01 to 0.05% by weight, calculated on monomeric vinyl chloride. Suitable wetting agents are the common ones, for example, sorbitan fatty acid esters, polyoxyethylene sorbitan fatty acid esters, as well as polymers and copolymers of alkylene oxides, for example ethylene or propylene oxide and the alkyl and aryl ethers and esters thereof.

The suspension stabilizers, emulsifiers and non-ionic wetting agents are added to the polymerization mixture prior to the beginning of polymerization. It is also possible, however, to meter in continuously or in portions partial amounts of the said auxiliaries (one or several) of at most 50% after the beginning of polymerization.

The suspension polymerization of vinyl chloride is effected in the usual temperature range of from 50 to 70° C. according to the common charge technique.

The suspension polymers obtained shall have K values of from 60 to 75, preferably 65 to 70. They are worked up in known manner by centrifugation and drying with hot air. The dry polymer contains about 80 to 90 weight % of the original amounts used during the polymerization of the oil-soluble activator and ist decomposition products, the suspensions stabilizer(s) and the non-ionic wetting agent(s).

Furthermore, according to German Offenlegungsschrift No. 2,402,314, only 30 to 80% of the total amount of the sulfonic acid used as emulsifier, optionally also of the total amount of suspension stabilizer, may be added before or, optionally, during the polymerization, and the remaining 70 to 20% of the total amount of sulfonic acid used as emulsifier, optionally also of the total amount of suspension stabilizer, may be applied after separation onto the polymer formed.

Alternatively, a polymer is suitable in the preparation of which down to 20% only of the total amount of sulfonic acid are added before or during the polymerization, and the remaining amount of up to 80% of the sulfonic acid are applied after separation onto the polymer formed.

The amount of free sulfonic acid in the vinyl chloride prepared by suspension polymerization as described above and having a K value of from 60 to 75, an apparent density of from 350 to 500 g/l, a plastifier uptake of from 12 to 25 weight %, a mean grain size of from 15 to 35 μm, a grain size distribution of from 60 to 98 weight % smaller than 33 μm
2 to 35 weight % from 33 to 63 μm
0 to 4.5 weight % from 63 to 125 μm
0 to 0.5 weight % greater than 125 μm, is determined for example by acidimetric titration (method see below), and from 10 to 70 equivalent weight % of the amount required for the complete uptake of the hydrogen ion (proton) from the free acid of at least one compound having a total number of from 6 to 60 carbon atoms and corresponding to the following formula

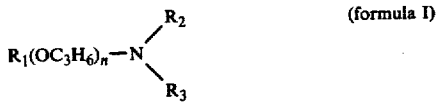

(formula I)

wherein $R_1$ through $R_3$ and $n$ are as defined above, are added.

Determination of the amount to be added is based on the fact that the hydrogen ion (proton) of the free sulfonic acid is absorbed exclusively by the nitrogen atom in the molecule of the compound(s) added, and that each nitrogen atoms absorbs one hydrogen ion (proton). The amount to be added so determined is hereinafter indicated as equivalent weight percentage or, in abbreviated form, as "val %," relative to the free sulfonic acid. When less than 10 val % of compounds of formula I are added, practically no favorable effect can be observed any more; on the other hand, an addition of more than 70 val % results in a deterioration of the mechanical properties of the sintered articles made from the molding compositions.

Such deterioration of the mechanical properties is observed also in the case where compounds of formula I are added which contain less than 6 carbon atoms on the whole. Although compounds of formula I having more than a total of 60 carbon atoms may be employed in principle, relatively large amounts are required in this case, so that economic considerations generally prevent their use. The nitrogen containing compounds are added after the polymerization is complete either to the aqueous suspension of the polymer or to the polymer still containing water or to the dry polymer obtained therefrom. The amount of acid present is determined immediately before adding the nitrogen containing compounds in that step of polymer work-up where the addition of the nitrogen containing compounds shall take place.

In order to achieve a better distribution, the nitrogen containing compounds may be used in the form of solutions, suspensions or dispersions in liquids such as water or aliphatic alcohols having from 1 to 4 carbon atoms.

Advantageously, the polymer is kept moving during the addition operation, for example by agitation, shoveling, whirling, centrifugation, trickling, pulverization or grinding. In the case where the polymer is present in solid or, because of its content of moisture, semisolid state, it is recommended to contact the nitrogen containing compounds in finely distributed state, for example by spraying or atomization, with the polymer.

After thorough intermixing with the nitrogen containing compound(s), the polymer may be worked up, if necessary, to a dry product according to the usual processes of water separation, such as suction-filtration, centrifugation and/or drying, for example in a drying cabinet, a fluidized bed, or a pneumatic conveying dryer. This dried product is generally used without further additives as molding composition for the manufacture of sintered plastic articles, especially separator plates for electric cells. If necessary, known processing aids may be added to the molding compositions of the invention, such as stabilizers against thermal decomposition; pigments; fillers, for example $SiO_2$, alumina, carbon black, graphite, barium sulfate, sawdust, asbestos, glass powder, finely ground silicates; other substances improving the flow properties in powder form; substances improving the wettability, for example polyglycols, glycol ethers or esters, sorbitane esters per se or reacted with ethylene oxide, or other known non-ionic wetting agents.

It is not absolutely required to prepare the molding compositions of the invention by addition of compounds of formula I to the sulfonic acid containing polymer or polymer dispersion. The following processes yield good results, too:

According to German Offenlegungsschrift No. 2,310,431, a vinyl chloride polymer is prepared in aqueous suspension in the presence of at least one alkylarylsulfonic acid having from 3 to 16 carbon atoms in the alkyl chain, or an alkylsulfonic acid having from 8 to 16 carbon atoms, or mixtures of the cited sulfonic acids, in such a manner that the dry polymer contains from 0.03 to 0.45 weight % of the cited sulfonic acid or sulfonic acid mixture, while taking into consideration acid losses occuring in the usual decantation of the aqueous suspension.

After polymerization and advantageously also after decantation, one or more salts of the formula

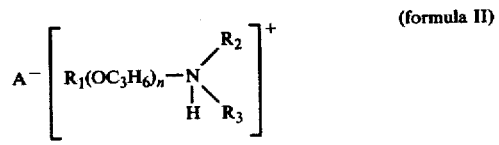

(formula II)

wherein $A^-$ is an anion of an alkylarylsulfonic acid having from 6 to 16 carbon atoms in the alkyl chain or an alkylsulfonic acid having from 8 to 16 carbon atoms, and $R_1$ through $R_3$ and $n$ are as defined above, and the total cation does not contain more than 6 to 60 carbon atoms, are added to the polymer; the amount added being chosen in such a manner that the amount of anion $A^-$ in the salts added is from 0.001 to 0.35 weight %, relative to dry polymer.

Instead of the final salts (formula II), alternatively mixtures of at least one sulfonic acid containing the anion $A^-$, and at least one nitrogen containing compound according to formula I may be added; these mixtures, however, must not necessarily contain equivalent amounts of both kinds of compounds. In the case where there is an excess of either the sulfonic acid or the nitrogen containing comound, it should, however, be limited in such a manner that the dry polymer has no more and no less than the content of free sulfonic acid having the anion $A^-$ and the content of at least one compound of formula II, which contents are mentioned above.

After addition of the compounds of formulae I or II, the polymer should contain a mixture of from 0.003 to 0.45 weight % (relative to dry polymer = total molding composition) of at least one alkylarylsulfonic acid having from 3 to 16 carbon atoms in the alkyl chain, or an alkylsulfonic acid having from 8 to 16 carbon atoms, or a mixture of the cited sulfonic acids, and of one or more salts consisting of from 0.001 to 0.35 weight % of the anions $A^-$ of the above sulfonic acids present in the polymer (=molding composition), and an equivalent amount of quaternary ammonium cations which have formed from the nitrogen containing compounds of formula I added or stem from the compounds of formula II, and which correspond to the following formula

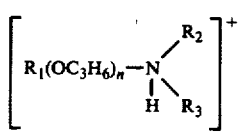

(formula III)

wherein $R_1$ through $R_3$ and $n$ are as defined above, and the total number of carbon atoms is from 6 to 60.

Preferred molding compositions are those which contain at least one compound of formula III having a total number of from 8 to 45 carbon atoms as quaternary ammonium cation. Especially good results are obtained with a content of at least one compound of formula III containing a total number of from 10 to 30 carbon atoms.

Preferred molding compositions are furthermore those which contain as quaternary ammonium cation at least one compound of the following formula

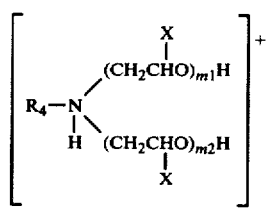

(formula IV)

wherein $R_4$ is a linear, branched or cyclic alkyl radical or an arylalkyl radical having from 8 to 18 carbon atoms, X is hydrogen or methyl, and $m_1$ and $m_2$ are integers the sum of which is from 2 to 10.

Preferred molding compositions are furthermore those which contain as quaternary ammonium cation at least one compound of the following formula

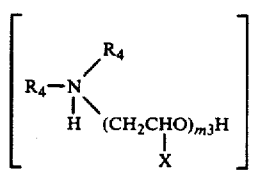

(formula V)

wherein $R_4$ and X are as defined above and $m_3$ is an integer of from 1 to 10.

Preferred molding compositions are furthermore those which contain as quaternary ammonium cation at least one compound of the following formula

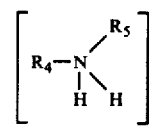

(formula VI)

wherein $R_4$ is as defined above and $R_5$ is hydrogen or identical to $R_4$.

In the following Table, there are listed examples of nitrogen containing organic compounds which are suitable for carrying out the process of the invention, or the salts of which with sulfonic acids containing the anion $A^-$ (as defined above) may be present in the molding compositions of the invention in admixture with the free sulfonic acids. The invention, however, is not limited to the cited compounds.

For reasons of a better survey, the different substituents only are indicated on the basis of formula I. In the case where $n$ is zero, this has been indicated in the Table by a dash, in order to avoid confusion with the chemical symbol for oxygen.

| | | | | | |
|---|---|---|---|---|---|
| *)Coconut alkyl and **)tallow alkyl represent alkyl group mixtures having the following chain length distribution (in %): | | | | | |
| | $C_8$ | $C_{10}$ | $C_{12}$ | $C_{14}$ | $C_{16}$ | $C_{18}$ |
| coconut alkyl | 7 | 6 | 51 | 19 | 8 | 9 |
| tallow alkyl | — | — | 1 | 3 | 31 | 65 |

| Compound No. | Total no. of carbon atoms | $R_1$ | n | $R_2$ | $R_3$ |
|---|---|---|---|---|---|
| 1 | 6 | n-hexyl- | — | —H | —H |
| 2 | 6 | cyclohexyl- | — | —H | —H |
| 3 | 9 | benzyl- | — | methyl- | methyl- |
| 4 | 11 | trimethylhexyl- | — | methyl- | methyl- |
| 5 | 12 | n-decyl- | — | methyl- | methyl- |
| 6 | 13 | iso-nonyl- | — | ethyl- | ethyl- |
| 7 | 14 | methylbenzyl- | — | propyl- | propyl- |
| 8 | 14 | n-decyl- | — | —CH$_2$CH$_2$OH | —CH$_2$CH$_2$OH |
| 9 | 16 | 2-ethylhexyl- | — | 2-ethylhexyl- | —H |
| 10 | 16 | iso-nonyl | 1 | —CH$_2$CH$_2$OH | —CH$_2$CH$_2$OH |
| 11 | 16 | benzyl- | — | benzyl- | —CH$_2$CH$_2$OH |
| 12 | 17 | n-decyl- | 1 | —CH$_2$CH$_2$OH | —CH$_2$CH$_2$OH |
| 13 | 18 | tridecyl- | 1 | methyl- | methyl- |
| 14 | 18 | coconut alkyl+ | — | —CH$_2$CH$_2$OH | —CH$_2$CHOHCH$_3$ |
| 15 | 19 | cyclohexyl- | 1 | —C$_3$H$_6$O—⟨H⟩ | methyl- |
| 16 | 21 | n-decyl- | — | n-decyl- | methyl- |
| 17 | 22 | dodecylbenzyl- | — | —CH$_2$CH$_2$OH | —CH$_2$CH$_2$OH |
| 18 | 22 | arachyl- | — | methyl- | methyl- |
| 19 | 22 | behenyl- | — | —H | —H |
| 20 | abt. 23 | tallow alkyl++ | — | —CH$_2$CHOHCH$_3$ | —CH$_2$CHOHCH$_3$ |
| 21 | 23 | n-decyl- | — | n-decyl- | propyl- |
| 22 | 24 | n-octyl- | — | n-octyl- | n-octyl- |
| 23 | 25 | iso-nonyl- | 1 | —C$_3$H$_6$OR$_1$ | methyl- |
| 24 | 27 | n-decyl- | — | n-decyl- | benzyl- |

-continued

| Compound No. | Total no. of carbon atoms | R$_1$ | n | R$_2$ | R$_3$ |
|---|---|---|---|---|---|
| 25 | 28 | n-dodecyl- | — | n-dodecyl- | —(C$_2$H$_4$O)$_2$H |
| 26 | 29 | n-octyl- | — | methyl- | —(C$_2$H$_4$O)$_{10}$H |
| 27 | 30 | oleyl- | — | —(C$_2$H$_4$O)$_3$H | —(C$_2$H$_4$O)$_3$H |
| 28 | 30 | iso-tridecyl- | — | iso-tridecyl- | benzyl- |
| 29 | 32 | n-dodecyl- | — | —(C$_2$H$_4$O)$_5$H | —(C$_2$H$_4$O)$_5$H |
| 30 | 33 | iso-tridecyl- | 1 | —C$_3$H$_6$OR$_1$ | methyl- |
| 31 | 36 | 2-ethylhexyl- | — | 2-ethylhexyl- | —(C$_2$H$_4$O)$_{10}$H |
| 32 | 38 | palmity- | 1 | —C$_3$H$_6$OR$_1$ | —H |
| 33 | 39 | oleyl- | — | oleyl- | —C$_3$H$_6$OH |
| 34 | 40 | n-dodecyl- | 1 | —C$_3$H$_6$OR$_1$ | —(C$_2$H$_4$O)$_5$H |
| 35 | 42 | stearyl- | 1 | —C$_3$H$_6$OR$_1$ | —H |
| 36 | 50 | decyl- | — | —(C$_2$H$_4$O)$_{10}$H | —(C$_2$H$_4$O)$_{10}$H |
| 37 | 55 | stearyl- | — | —CH$_3$ | —(C$_3$H$_6$O)$_{12}$H |
| 38 | 59 | stearyl- | — | —CH$_3$ | —(C$_2$H$_4$O)$_{20}$H |
| 39 | 60 | C$_{20}$- | — | —(C$_2$H$_4$O)$_{10}$H | —(C$_2$H$_4$O)$_{10}$H |

The nitrogen containing compounds to be added in accordance with this invention may be used per se or as mixtures of several of them. In the latter case, the equivalent weight percentages of the single compounds are summed up, and the sum of them should be from 10 to 70 val % of the analytically determined val % amount (= 100 val %) of free sulfonic acid.

The compounds of formula I may be prepared according to one or several of the following processes:

(a) exchange of an organically bound halogen by ammonia or amines (Houben-Weyl, Methoden der organischen Chemie, vol. XI/1 (1957), pp. 33–41);

(b) aminolysis of aliphatic or araliphatic alcohols (Houben-Weyl, loc. cit. pp. 112–118 and 120, see further German Pat. No. 637,731; British Pat. No. 463,711; U.S. Pat. Nos. 2,636,902 and 3,766,184);

(c) reaction of primary or secondary aliphatic amines with alkylene oxides, especially ethylene or propylene oxide (Houben-Weyl, loc. cit. pp. 311–312);

(d) cyanoethylation of aliphatic or araliphatic alcohols with acrylonitrile (Organic Reactions vol. V, pp. 89–91, and Tables VI and VII; British Pat. No. 544,421, German Auslegeschrift No. 1,238,028);

(e) hydrogenation of nitrile to amine (Houben-Weyl, loc. cit, p. 554 and 561; German Pat. No. 1,094,748, German Auslegeschrift No. 1,280,243, U.S. Pat. Nos. 2,781,399 and 2,784,232);

(f) transposition of primary ether amines to secondary ones in the presence of hydrogenation catalysts (Houben-Weyl, loc. cit., p. 347, and Table 44).

The process of the invention has the advantage of simple operation and low expenditure. The molding compositions obtained give sintered articles, especially separator plates for electric cells which are distinguished by good mechanical (tensile strength, elongation at break) and electric (specific volume resistivity) dates, good wettability (capillary rise), and which show satisfactory color shades. During the operation of cells provided with such plates, practically no foaming can be observed. Because of the relatively high thermostability, reduced tendency to electrostatic charge anc corrosion, the molding compositions are highly suitable for being processed on the corresponding manufacturing equipment even for prolonged periods.

The following examples and comparative tests illustrate the invention. For a better survey, the results are listed in the form of a Table.

(1) TESTS ON THE POLYMER

Equivalent weight % amount of free sulfonic acid by acidimertric titration with benzyldimethyl-2,2-p-1,1,3,3,-tetramethyl-butyl-phenoxyethoxy-ethoxyethylammonium chloride (Fette, Seifen, Anstrichmittel vol. 73, p. 683 (1971); Deutsche Einheitsmethoden zur Untersuchung von Fetten, Fettprodukten und verwandten Stoffen 43, Mitteilung Prof. Seber: Analyse von organischen, grenzfachenaktiven Stoffen II).

(2) TESTS ON THE MOLDING COMPOSITION CAPABLE OF BEING SINTERED THERMOSTABILITY 300 g of the PVC powder are carefully mixed with 3 g of a sulfur/tin stabilizer (for example dibutyl-tin-bis-thioglycolic acid-2-ethylhexyl ester) and 3 g of montanic acid ester of ethanediol, and maintained without friction on a roll mill having a temperature of the rolls of 175° C., until the material shows a dark-brown color. Every 5 minutes, a small plate having a thickness of about 1 mm is taken off, and these specimens, in accordance with the time of their withdrawal, are sticked onto a white cardboard. By visual evaluation, that specimen is determined which shows a clear dark discoloration as compared to the starting specimen. The time of withdrawal of the preceding (not yet discolored) specimen is recorded as measure of the thermostability.

ANTISTATIC BEHAVIOUR

The molding composition is firts stored without cover in the form of a thin layer for 24 hours at 23° C. and 50% of relative humidity; subsequently, it is given into a cylindric vessel having an inner diameter of 25 cm and a height of 25 cm. A triangular aluminum sheet having a thickness of about 0.5 mm, a determined weight, a basis line of 20 cm and a height of 20 cm (total area about 4 dm$^2$) is completely immersed in the molding composition and, after a residence time of 1 minute, it is removed from the powder within about 1 second. The amount of powder adhering to the sheet is then determined by immediate weighing. The processing behaviour of the molding composition on sintering machines for separator plates results from the following experimental values.

| Weight of the adhering powder | Processing behaviour of the molding compound tendency to adhesion |
|---|---|
| 250 mg | none |
| 250 – 500 mg | slight |
| 500 – 750 mg | distinct |
| 750 – 1000 mg | pronounced |
| more than 1000 mg | very pronounced |

CORROSION

The corrosive effect of the powder on unalloyed steel is determined according to German Industrial Standard DIN 40 620, paragraph 5.33. 20 g of powder are stored without cover for 48 hours in a moisture chamber at a relative atmospheric humidity of 93% and 20° C. ± 5° C. (generation of atmospheric humidity according to VDE 0308). Subsequently, the powder is given into a test tube having a diameter of 25 mm and a height of 200 mm, together with a strip of unalloyed steel (150 × 15 × 2 mm, ST 37 M) which has a pure metallic surface. The test tube is closed and stored in vertical position for 96 hours at 70° C. ± 5° C. Evaluation is carried out in comparison to a blank test (that is, without powder in the test tube) according to the following marks:

1 bright surface
2 slight traces of rust formation
3 distinct rust formation
4 more pronounced rust formation
5 very pronounced rust formation.

Apparent density according to German Industrial Standard DIN 53 468.

Plasticizer uptake

A filter paper soaked with di-2-ethylhexyl phthalate (dioctyl phthalate = DOP) is tightly fitted to the perforated inner bottom of a centrifuge cup inset (laboratory centrifuge according to German Industrial Standard DIN 58 970 E), and the inset with the filter paper is weighed (weight $m_1$). Subsequently, 10.0 g of polymer sample are weighed into this inset (weight $m_2$), about 20 g of DOP are added and allowed to stand for 5 minutes. Thereafter, the contents are centrifuged off from the bottom of the perforated inset for 60 minutes at a centrifuge acceleration of from 25 000 to 26 00 m/sec$^2$. The inset is then cleaned at the outside by wiping with filter paper and weighed with its contents (weight $m_3$). The plasticizer uptake which is also a measure for the porosity of the polymer grain is calculated (in weight %) according to the following equation $$\frac{m_3 - m_2}{m_2 - m_1} \cdot 100$$

The indicated values are the average from 10 individual measures taken.

Determination of mean grain size by sedimentation analysis:

1.82 of PVC are dispersed in 600 ml of a 0.09% sodium pyrophosphate solution which had been well degassed previously, and the sedimentation tendency is measured by means of a Sartorius type 4 600 sedimentation balance at an advance of the recording paper of 120 mm/h. Calculation is based on the known Stokes' equation and gives the particle radius.

Grain size distribution by means of air jet sieve analysis according to German Industrial Standard draft DIN 53 734.

(3) TESTS ON THE SINTERED PLATES

Manufacture of the sintered plates:

The separator plates are manufactured on a continuous belt sintering machine. Polyvinyl chloride powder is applied in a determined thickness onto an endless steel belt and passed through a sintering stove adjusted to a temperature of 325° C. by means of electric heating. By varying the speed of the belt, the residence time and the intensity of sintering of the PVC powder can be controlled. The speed of the belt is adjusted in this case to 1.5-1.9 m/min., preferably 1.7 m/min., so that the finished separator plate has an electric resistance of 1.6 milliohms/dm$^2$. The separator plates are manufactured in such a manner that they have a thickness of the blade of 0.40 mm and of the rib of 1.1 mm.

Elongation at break and tensile strength

According to German Industrial Standard DIN 53 455 (tensile test on plastics) the elongation at break and the tensile strength (tensile stress) are determined. Since standardized specimens are not at hand, specimens having a size of 60 × 140 mm are cut from the sintered plates. The tests are carried out on a tensile test machine corresponding to the general requirements for such machines (German Industrial Standard DIN 51 220, class 1, and DIN 51 221) after a 16 hours storage in standard atmosphere (German Industrial Standard DIN 50 014/1) at 23° ± 2° C. and 50 ± 5% of relative atmospheric humidity. The test speed (speed at which the two gripping devices are pulled apart from each other) is 50 m/min ± 10%. The stress measuring range is around 1000 N. Stress and strain are recorded by means of a recording device on a diagram drum. The recorded advance proportional to elongation is adjusted to an enlargement of 5:1. The elongation is relative to 100 mm of free grip length.

Capillary rise

The capillary rise serves as measure for the wettability of the separator plates and for characterizing the porosity. A strip of the separator plate having a width of 1 cm is placed in the test tube which is filled with water up to a height of 1.5 cm. The wetting level after a dipping time of 10 minutes is indicated as capillary rise.

Specific electric resistance

The electric resistance of separator plates is determined by measuring the so-called inner resistance of cells, which is carried out according to a test arrangement (battery cell) specially designed for this purpose. The difference between the cell resistance with and without separator plate gives the negative resistance of the latter one. By multiplication with the quotient of plate area by plate thickness the specific volume resistivity is determined in ohms·cm.

The test cell consists of a positive and a negative plate (PbO and Pb) which are arranged parallelly at a distance of 7 mm from each other. As electrodes, plates of size and design as is usual for a lead accumulator are employed. Exactly between the electrodes, in a window-like opening of a size of 100 × 100 mm, the separator is fitted. The test cell is filled with sulfuric acid having a density of 1.28, and completely charged. Such low-ohm inner resistance is measured with a.c. from the mains by means of a micro-ohmmeter with direct reading (type EMT 326, company: Elektromesstechnik W. Franz KG, Lahr West-Germany), which is connected to both the electrodes.

Color

Evaluation is carried out visually according to the following marks:

mark 1 light pink
mark 2 pink with beige
mark 3 violet-pink (lilac)
mark 4 medium brown mark 5 dark brown
mark 6 dark brown to olive green

Comparative test A

A mixture consisting of 440 parts by weight of vinyl chloride
870 parts by weight of deionized water
2.2 parts by weight of methyl cellulose (viscosity 400 cP, 2 weight % solution at 20° C.)
1.4 part by weight of n-dodecylbenzenesulfonic acid
0.22 part by weight of polyoxyethylene-sorbitane-monolaurate
0.088 part by weight of di-isopropylperoxy-dicarbonate is polymerized for 7 hours at 59° C. and 150 rpm in a 1500 liter vessel (stainless steel, impeller agitator). The fine-grained polymer paste obtained is centrifuged on a decanter, and the wet material is dried in a pneumatic conveying dryer by means of hot air (inlet 150° C., outlet 85° C.). The polymer so obtained has the following dates:

| K value | 68.0 |
|---|---|
| apparent density (g/l) | 410 |
| plasticizer uptake (dioctyl phthalate), weight % | 15 |
| mean grain size (μ) | 20 |
| Sieve analysis (%) | |
| <33 μ | 96.0 |
| >33 to <63 μ | 3.1 |
| >63 to <125 μ | 0.7 |
| >125 μ | 0.2 |

The titrimetrically determined amount of free sulfonic acid is 0.17 weight % (relative to polymer) = $0.521 \cdot 10^{-3}$ equivalent weight % (= val %). Sintered plates as above described are manufactured from this polymer. The dates of this molding composition as well as of the sintered plates made therefrom are listed in the following Table.

Comparative test B

Operations are as described for Comparative test A; however the polyoxyethylene-sorbitane-monolaurate is omitted. For K value, apparent density, plasticizer uptake, mean grain size and content of free sulfonic acid, the dates are the same as those of Comparative test A. Results of measurements for this molding composition and sintered plates made therefrom are indicated in the Table.

Comparative test C

In a vessel having a capacity of 1500 liters (stainless steel, impeller agitator), a mixture consisting of 440 parts by weight of vinyl chloride
870 parts by weight of deionized water
2.2 parts by weight of methyl cellulose (viscosity 440 cP, 2 weight % solution at 20° C.)
0.66 part by weight of n-dodecylbenzenesulfonic acid
0.088 part by weight of di-isopropylperoxy-dicarbonate is polymerized for 7 hours at 59° C. and 150 rpm. The fine-grained polymer paste obtained is centrifuged off by means of a decanter. The product centrifuged contains about 35% of water. Before entering a pneumatic conveying dryer, 0.56 parts of n-dodecylbenzenesulfonic acid in the form of a 10% aqueous solution is applied onto the material leaving the decanter via a nozzle by means of a pump. The polymer so treated is subsequently dried in a pneumatic conveying dryer by means of hot air (inlet 150°, outlet 85° C.).

The polymer so obtained has the following dates:

| K value | 65.3 |
|---|---|
| apparent density (g/l) | 460 |
| plasticizer uptake dioctyl phthalate (weight %) | 15 |
| means gran size (μ) | 22 |
| sieve analysis (%) | |
| <33 μ | 89.0 |
| >33 to < 63 μ | 10.0 |
| >63 to <125 μ | 1.0 |
| >125 μ | 0 |

The titrimetrically determined amount of free sulfonic acid is 0.22 weight %, relative to polymer, = $0.675 \cdot 10^{-3}$ val %.

Results of measurements for this molding composition and the sintered plates made therefrom are listed in the Table.

Comparative test D 36 g (= 0.18 weight %, relative to polymer = $0.380 \cdot 10^{-3}$ val %) of a compound of the formula

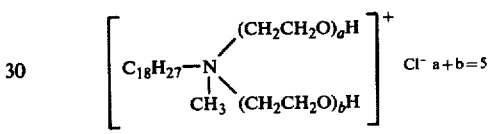

in the form of a 5 weight % solution are added to 20 kg of a commercial fine-grained suspension PVC having the following dates:

| K value | 62.1 |
|---|---|
| apparent density (g/l) | 470 |
| plasticizer uptake dioctyl phthalate (weight %) | 15 |
| mean grain size (μ) | 33 |
| sieve analysis (%) | |
| <33 μ | 42.0 |
| >33 to <63 μ | 54.5 |
| >63 to <125 μ | 3.3 |
| 125 μ | 0.2 |

The whole is thoroughly mixed and dried in a drying cabinet for 2 hours at 80° C.

Measuring results of this molding composition and of sintered plates made therefrom are listed in the Table.

Comparative test E 56.2 g (0 0.281 weight %, relative to polymer = $0.521 \cdot 10^{-3}$ val %) of a compound of the formula

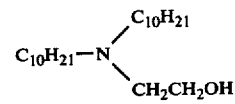

in the form of a 5% solution in ethanol/water (2:1) are added to 20 kg of a polymer prepared as described in Comparative test B, the whole is thoroughly mixed and dried for 2 hours at 80° C. in a drying cabinet.

Measuring results of this molding composition and sintered plates made therefrom see Table.

EXAMPLES 1 TO 38

An amount each which correspond to $0.130 \cdot 10^{-3}$ val % (= 25% of the titrimetrically determined $0.521 \cdot 10^{-3}$ val % of the free sulfonic acid contained in the polymer) is added to 20 kg each of a polymer obtained as described in Comparative test B. The compounds added are listed in the Table.

In Example 1, 3.35 g = 0.0167 weight %  
In Example 10, 10.27 g = 0.0513 weight %   } relative to polymer  
In Example 20, 30.60 g = 0.153 weight % are added.

These indications are examples; the amount in grams is not indicated for each example, in order not to overburden the Table with dates and thus to reduce its clearness. The compounds are added in the form of a 5 weight % solution in ethanol/water (2:1). Subsequently, the whole is thoroughly mixed and the mixture is dried for 2 hours at 80° C. in a drying cabinet. Measuring results of the molding compositions of the invention and the sintered plates made therefrom see Table.

EXAMPLES 39 TO 41

According to the conditions of Comparative test A, a mixture consisting of 440 parts by weight of vinyl chloride
870 parts by weight of deionized water
2.2 parts by weight of methyl cellulose (viscosity 400 cP, 2 weight % solution, 20° C.)
1.1 part by weight of n-alkanesulfonic acid, chain section $C_{12}$ to $C_{16}$, preponderant content of $C_{14}$
0.088 part by weight of di-isopropylperoxy-dicarbonate is polymerized and dried.

The titrimetrically determined content of free sulfonic acid is 0.128 weight % (relative to polymer) = $0.461 \cdot 10^{-3}$ val % (average molecular weight of the sulfonic acid = 278).

Varying amounts of the compound used in Comparative test E are added to 20 kg each of the polymer so obtained. Operations are as described in Examples 1 to 38. The added amounts are determined in such a manner that

| | |
|---|---|
| in Example 39 | 25 % |
| in Example 40 | 50 % and |
| in Example 41 | 70 % | of the val % amount of the free sulfonic acid ($0.461 \cdot 10^{-3}$ val % = 100%) are added.

Measuring results of the molding compositions of the invention and the sintered plates made therefrom see Table.

EXAMPLES 42 AND 43

Operations of Example 43 are as described for Examples 1 to 38; however, instead of the polymer prepared according to Comparative test B, the polymer according to Comparative test C is used.

Example 42 differs from Example 43 only by the fact that, after polymerization of the vinyl chloride, 0.15 part by weight instead of 0.56 part weight of n-dodecyl-benzenesulfonic acid are applied onto the polymer after the decanter.

K value, apparent density, plasticizer uptake, mean grain size, and the sieve analysis remain unchanged. The titrimetrically determined sulfonic acid content of the polymer is 0.11 weight %, relative to polymer = $0.336 \cdot 10^{-3}$ val %. Accordingly, 50% of this amount, = $0.168 \cdot 10^{-3}$ val % of the compound indicated in the Table are added.

Measuring results of molding compositions and sintered plates see Table.

EXAMPLES 44 TO 47

Operations are in principle as described for Examples 1 to 38; the same polymer (according to Comparative test B) being used. The following varying amounts of the compound indicated in the Table are added:

| | | |
|---|---|---|
| Example 44 | 12.5 | % |
| Example 45 | 25 | % |
| Example 46 | 50 | % |
| Example 47 | 75 | % | of the val % amount of the free sulfonic acid present ($0.521 \cdot 10^{-3}$ val % = 100%).

Measuring results of the molding compositions and sintered plates see the following Table.

| Comparative tests and Examples | Polymer free sulfonic acid amount val-% ·10⁻³ | Compound of Formula I added | | | | | | Properties of molding composition | | | Properties of sintered plates | | | | |
|---|---|---|---|---|---|---|---|---|---|---|---|---|---|---|---|
| | | Amount val-% ·10⁻³ | $R_1$ | $R_1-(OC_3H_6)_n-N<^{R_2}_{R_3}$ n | $R_2$ | $R_3$ | number of C atoms. | Thermo-stability min. | antistatic behaviour deposit g | corrosion Note | Tensile strength N/mm² | Elongation at break % | capillary rise mm | specific volume resistivity Ohm cm | Color Note |
| A | 0,521 | — | | | | | — | 15 | 500-750 | 4 | 9,5 | 6,3 | 153 | 3,8 | 4 |
| B | 0,521 | — | | | | | — | 15 | 750-1000 | 4 | 9,3 | 6,2 | 122 | 3,9 | 4 |
| C | 0,675 | — | | | | | — | 10 | 750-1000 | 5 | 8,6 | 6,1 | 133 | 4,3 | 5 |
| D | — | 0,380 | N-stearyl-,N-methyl-,NN-pentaoxy-ethylammonium chloride | | | | 29 | <10 | <250 | 1 | 2,5 | 1,8 | 107 | 2,1 | 3 |
| E | 0,521 | 0,521 | $C_{10}H_{21}$ | | — $C_{10}H_{21}$ | $OC_2H_5$ | 22 | 60 | <250 | 1 | 2,8 | 2,1 | 119 | 2,5 | 3 |
| 1 | 0,521 | 0,130 | 2-Aethyl-hexyl- | | H— | H— | 8 | 45 | 250-500 | 2 | 6,5 | 4,8 | 131 | 3,2 | 1 |
| 2 | 0,521 | 0,130 | $C_{12}H_{25}$— | | H— | H— | 12 | 45 | 250-500 | 2 | 9,2 | 6,3 | 128 | 3,2 | 1 |
| 3 | 0,521 | 0,130 | $C_{22}H_{45}$— | | H— | H— | 22 | 45 | 250-500 | 2 | 10,3 | 5,9 | 130 | 3,3 | 1 |
| 4 | 0,521 | 0,130 | $C_8H_{17}$— | | $C_8H_{17}$— | H— | 16 | 45 | 250-500 | 2 | 7,6 | 5,1 | 127 | 3,3 | 1 |
| 5 | 0,521 | 0,130 | $C_8H_{17}$— | | $C_{12}H_{25}$— | H— | 19 | 35 | 250-500 | 2 | 6,5 | 4,9 | 127 | 3,2 | 3 |
| 6 | 0,521 | 0,130 | $C_{18}H_{37}$— | | $CH_3$— | $CH_3$— | 19 | 45 | 250-500 | 2 | 9,5 | 5,8 | 131 | 3,2 | 1 |
| 7 | 0,521 | 0,130 | $C_8H_{17}$— | | $CH_3$— | $CH_3$— | 10 | 45 | 250-500 | 2 | 8,5 | 5,6 | 125 | 3,3 | 1 |
| 8 | 0,521 | 0,130 | Talgalkyl | | $CH_3$— | $CH_3$— | ~19 | 30 | 250-500 | 2 | 7,4 | 5,1 | 130 | 3,3 | 1 |
| 9 | 0,521 | 0,130 | $C_{18}H_{37}$— | | $C_{18}H_{37}$— | $CH_3$— | 37 | 45 | 250-500 | 2 | 9,6 | 5,8 | 128 | 3,1 | 3/spotty |
| 10 | 0,521 | 0,130 | $iC_{13}H_{27}$— | | $iC_{13}H_{27}$— | $CH_3$— | 27 | 45 | 250-500 | 2 | 9,3 | 6,2 | 130 | 3,2 | 1 |
| 11 | 0,521 | 0,130 | $C_{10}H_{21}$— | | $C_{10}H_{21}$— | $C_{10}H_{21}$— | 27 | 35 | 250-500 | 2 | 8,2 | 5,3 | 125 | 3,1 | 3 |
| 12 | 0,521 | 0,130 | $C_{18}H_{27}$— | | $C_{18}H_{27}$— | $C_3H_7$— | 54 | 45 | 250-500 | 2 | 7,3 | 5,9 | 127 | 3,2 | 1 |
| 13 | 0,521 | 0,131 | $C_{10}H_{21}$— | | $C_{10}H_{21}$— | $C_2H_4OH$ | 23 | 45 | 250-500 | 2 | 7,9 | 6,0 | 130 | 3,1 | 3/spotty |
| 14 | 0,521 | 0,130 | n-Oleyl | | n-Oleyl | $CH_3$— | ~29 | 30 | 250-500 | 2 | 6,8 | 5,2 | 126 | 3,3 | 1 |
| 15 | 0,521 | 0,130 | Cocos-alkyl | | 16 | $C_2H_4OH$ | 45 | <250 | 2 | 10,5 | 6,3 | 131 | 3,1 | 1 |
| 16 | 0,521 | 0,130 | $C_8H_{17}$— | | $C_2H_{25}$— | —$(C_2H_4O)_2H$ —$C_3H_6OH$ | 22 | 40 | <250 | 3 | 9,1 | 5,8 | 128 | 3,1 | 3/spotty |
| 17 | 0,521 | 0,130 | $C_{18}H_{37}$— | | —$C_3H_6OH$ | —$C_3H_6OH$ | 24 | 45 | <250 | 2 | 8,3 | 5,1 | 128 | 3,1 | 1 |
| 18 | 0,521 | 0,130 | Oleyl— | | —$C_2H_6OH$ | —$C_2H_6OH$ | 23 | 45 | <250 | 2 | 7,5 | 5,8 | 128 | 3,3 | 1-3 |
| 19 | 0,521 | 0,130 | $C_{18}H_{37}$— | | —$(C_2H_4O)_3H$ | —$(C_2H_4O)_3H$ | 27 | 35 | <250 | 3 | 8,0 | 5,1 | 128 | 3,3 | 1-3 |
| 20 | 0,521 | 0,130 | $C_{20}H_{41}$— | | —$(C_2H_4O)_{10}H$ | —$(C_2H_4O)_{10}H$ | 60 | 30 | <250 | 3 | 9,2 | 4,9 | 125 | 3,2 | 1-3 |
| 21 | 0,521 | 0,130 | $iC_{10}H_{21}$— | | —$C_3H_6$— | —$C_3H_6OH$ | 13 | 45 | <250 | 2 | 8,7 | 5,3 | 128 | 3,3 | 1-3 |
| 22 | 0,521 | 0,130 | $C_{40}H_{21}$— | | —$(C_2H_4O)_{10}H$ | —$(C_4H_4O)_{10}H$ | 50 | 30 | <250 | 3 | 8,7 | 5,0 | 131 | 3,1 | 1-3 |
| 23 | 0,521 | 0,130 | $C_8H_{17}$— | | —$C_3H_6OH$ | —$C_2H_4OH$ | 30 | 30 | <250 | 3 | 7,5 | 5,4 | 128 | 3,3 | 1-3 |
| 24 | 0,521 | 0,130 | $C_{12}H_{25}$— | | $CH_2$—$CH_2$— | —$(C_2H_4O)_{12}H$ | 30 | <250 | 3 | 8,0 | 125 | 3,1 | 1-3 | 1-3 |
| 25 | 0,521 | 0,130 | $iC_{13}H_{25}$— | | —$C_2H_5$— | —$C_2H_4O_2H$ | 30 | 45 | <250 | 2 | 5,1 | 6,2 | 125 | 1-3 | 1 |
| 26 | 0,521 | 0,130 | $C_{12}H_{25}$— | | —$C_{12}H_{25}$ | —$(C_2H_4O)_{10}H$ | 39 | 30 | 250-500 | 3 | 7,5 | 5,1 | 125 | 3,3 | 1-3 |
| 27 | 0,521 | 0,130 | $C_{18}H_{37}$— | | —$CH_2$— | —$(C_3H_6O)_{12}H$ | 55 | 30 | <250 | 3 | 8,4 | 5,2 | 128 | 3,4 | 1 |
| 28 | 0,521 | 0,130 | Oleyl— | | —CH— Oleyl— | $C_3H_5OH$ $C_2H_4O_{20}H$ | 39 | 45 | <250 | 2 | 7,4 | 6,1 | 128 | 3,3 | 3/spotty |
| 29 | 0,521 | 0,130 | $C_{18}H_{37}$— | | $CH_3$— | $CH_3$— | 59 | 30 | 250-500 | 3 | 7,4 | 5,0 | 125 | 3,1 | 1-3 |
| 30 | 0,521 | 0,130 | $C_{18}H_{37}$— | | H | H | 21 | 45 | 250-500 | 2 | 8,3 | 6,5 | 130 | 3,3 | 3 |
| 31 | 0,521 | 0,130 | $iC_{9}H_{19}$— | | H | H | 9 | 45 | 250-500 | 2 | 7,5 | 5,7 | 130 | 3,3 | 3 |
| 32 | 0,521 | 0,130 | $C_{14}H_{29}$— | | —$(C_2H_5O)_5$ | —$(C_2H_5O)_5$ | 37 | 30 | <250 | 3 | 6,1 | 5,8 | 128 | 3,3 | 3 |
| 33 | 0,521 | 0,130 | $C_{12}H_{25}$— | | —$C_{18}H_{37}$ | H | 33 | 40 | <250 | 2 | 6,8 | 5,6 | 128 | 3,1 | 3 |
| 34 | 0,521 | 0,130 | $C_{18}H_{37}$— | | —$C_{12}H_{25}$ | $(C_2H_4O)_2H$ | 42 | 40 | 250-500 | 2 | 7,0 | 5,3 | 135 | 3,1 | 3 |
| 35 | 0,521 | 0,130 | $iC_{9}H_{19}$— | | $iC_{9}H_{19}$ | $(C_2H_4O)_{10}H$ | 40 | 35 | 250-500 | 2 | 7,3 | 5,5 | 130 | 3,1 | 3 |
| 36 | 0,521 | 0,130 | $C_{12}H_{25}$— | | $C_{12}H_{25}$ | H | 39 | 40 | 250-500 | 2 | 5,9 | 5,3 | 130 | 3,1 | 3 |
| 37 | 0,521 | 0,130 | $C_{16}H_{35}$— | | $CH_3$ | $(C_3H_5O)_3H$ | 35 | 30 | 250-500 | 3 | 5,5 | 5,8 | 133 | 3,3 | 3 |
| 38 | 0,521 | 0,130 | $C_{12}H_{25}$— | | $C_{12}H_{25}$ | $(C_3H_7O)_{10}H$ | 60 | 30 | 250-500 | 3 | 7,0 | 5,1 | 133 | 3,3 | 3 |

-continued

| Comparative tests and Examples | Polymer free sulfonic acid amount val-% .10⁻³ | Compound of Formula I added Amount val-%.10⁻³ | R₁ | R₁—(OC₃H₆)ₙ—N⟨R₂/R₃⟩ n | R₂ | R₃ | number of C atoms. | Thermo- stability min. | antistatic behaviour deposit s | corrosion Note | Tensile strength N/mm² | Elongation at break % | capillary rise mm | specific volume resistivity Ohm cm | Color Note |
|---|---|---|---|---|---|---|---|---|---|---|---|---|---|---|---|
| 39 | 0,461 | 0,115 | C₁₀H₂₁ | — | — | C₂H₅OH | 22 | 45 | <250 | 2 | 8,5 | 5,9 | 125 | 3,2 | 1–3 |
| 40 | 0,461 | 0,230 | C₁₀H₂₁ | — | — | C₂H₅OH | 22 | 50 | <250 | 2 | 9,0 | 5,6 | 125 | 3,4 | 1–3 |
| 41 | 0,461 | 0,322 | C₁₀H₂₁ | — | C₁₀H₂₁ | C₂H₅OH | 22 | 55 | <250 | 1–2 | 8,8 | 5,1 | 130 | 3,5 | 3 |
| 42 | 0,336 | 0,168 | C₁₂H₂₅ | — | C₁₀H₂₁ | C₂H₅OH | 16 | 50 | <250 | 2 | 6,5 | 4,8 | 128 | 3,4 | 1–3 |
| 43 | 0,675 | 0,337 | C₁₂H₂₃ | — | C₂H₅OH | C₂H₅OH | 16 | 50 | <250 | 2 | 9,5 | 12,8 | 3,4 | 1–3 | |
| 44 | 0,0065 | 0,0065 | C₁₂H₂₅ | — | C₂H₃OH | C₂H₅OH | 16 | 30 | <250 | 3 | 5,8 | 6,1 | 130 | 3,2 | 2–1 |
| 45 | 0,521 | 0,130 | C₁₂H₂₅ | — | C₂H₅OH | C₂H₅OH | 16 | 45 | <250 | 2 | 10,5 | 6,3 | 131 | 3,1 | 1 |
| 46 | 0,521 | 0,260 | C₁₂H₂₅ | — | C₂H₅OH | C₂H₅OH | 16 | 50 | <250 | 2 | 9,5 | 5,1 | 127 | 3,3 | 1–3 |
| 47 | 0,521 | 0,364 | C₁₂H₂₅ | — | C₂H₅OH | C₂H₅OH | 16 | 55 | <250 | 8,5 | 4,9 | 12,8 | 3,4 | 3 | |

What is claimed is:

1. Finely distributed molding composition capable of being sintered made from suspension polyvinyl chloride having a K value of from 60 to 75, an apparent density of from 350 to 500 g/l, a plastifier uptake of from 12 to 25 weight %, a mean grain size of from 15 to 35 μm, a grain size distribution of from 60 to 98 weight % smaller than 33 μm
2 to 35 weight % from 33 to 63 μm
0 to 4.5 weight % from 63 to 125 μm
0 to 0.5 weight % greater than 125 μm, prepared by suspension polymerization of vinyl chloride in aqueous phase by means of oil-soluble activators, in the presence of at least one suspension stabilizer and from 0.01 to 0.5 weight %, relative to monomer vinyl chloride, of at least one alkylarylsulfonic acid having from 3 to 16 carbon atoms in the alkyl chain, or of at least one alkylsulfonic acid having from 8 to 16 carbon atoms, or mixtures of the cited sulfonic acids, whereby a further amount of at least one of these sulfonic acids may be added to the polymer obtained after its separation from the polymerization mixture, wherein the molding composition comprises (a) from 0.003 to 0.45 weight % (relative to the total molding composition) of at least one of the said sulfonic acids, and
(b) from 1/9 to 7/3 of the amount cited sub a) of at least one anion of the said sulfonic acids in the form of their salts with at least one organic cation having a total number of from 6 to 60 carbon atoms, and corresponding to the following formula

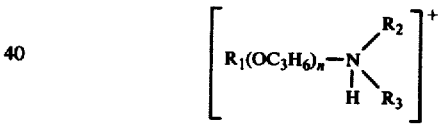

wherein R₁ is a linear, branched or cyclic, saturated or unsaturated alkyl radical or arylalkyl radical having from 6 to 22 carbon atoms; n is 0 or 1; R₂ and R₃, being identical or different, each are hydrogen, a linear, branched or cyclic, saturated or unsaturated alkyl or aralkyl radical having from 1 to 22 carbon atoms, a radical of the formula

wherein X is H or CH₃ and m an integer of from 1 to 20; or R₂ or R₃ is a radical of the formula —C₃H₆O—R₁, wherein R₁ is as defined above.

2. Finely distributed molding composition capable of being sintered as claimed in claim 1, wherein the cation of the formula

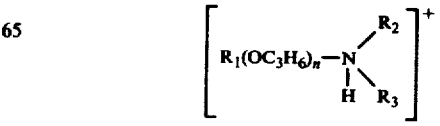

being present in the form of a salt with a sulfonic acid anion contains a total number of carbon atoms of from 8 to 45, especially from 10 to 30.

3. Finely distributed molding composition capable of being sintered as claimed in claim 1, wherein the cation being present in the form of a salt with a sulfonic acid anion has the following formula

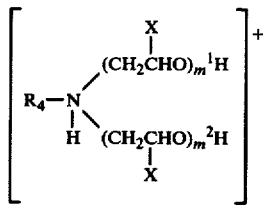

in which $R_4$ is a linear, branched or cyclic saturated or unsaturated alkyl radical or an aralkyl radical having from 8 to 18 carbon atoms, X is hydrogen or methyl and $m_1 + m_2$ is an integer of from 2 to 10.

4. Finely distributed molding composition capable of being sintered as claimed in claim 1, wherein the cation being present in the form of a salt with a sulfonic acid anion has the following formula

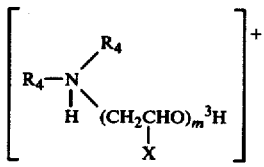

in which $R_4$ and X are as defined in claim 3, and $m_3$ is an integer of from 1 to 10.

5. Finely distributed molding composition capable of being sintered as claimed in claim 1, wherein the cation being present in the form of a salt with a sulfonic acid anion has the following formula

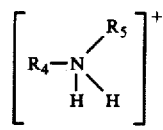

in which $R_4$ is as defined in claim 3 and $R_5$ is hydrogen or identical to $R_4$.

6. A process for the manufacture of a finely distributed polyvinyl chloride molding composition capable of being sintered by suspension polymerization of vinyl chloride in aqueous phase by means of oil-soluble activators, in the presence of at least one suspension stabilizer and from 0.01 to 0.5 weight %, relative to monomer vinyl chloride, of at least one alkylarylsulfonic acid having from 3 to 16 carbon atoms in the alkyl chain, or of at least one alkylsulfonic acid having from 8 to 16 carbon atoms, or mixtures of the cited sulfonic acids, whereby a further amount of at least one of these sulfonic acids may be added to the polymer obtained after its separation from the polymerization mixture, which comprises adding after the polymerization, in the presence or absence of solvents, from 10 to 70 equivalent weight %, relative to the acid amount acidimetrically determined before the addition of at least one compound having a total number of from 6 to 60 carbon atoms and corresponding to the following formula

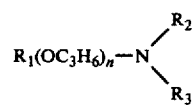

in which $R_1$ through $R_3$ and $n$ are as defined in claim 1.

7. A process for the manufacture of sintered porous plastic molded articles, which comprises sintering a molding composition as claimed in claim 1.

8. A process for the manufacture of separator plates for electric cells, which comprises sintering a molding composition as claimed in claim 1 to form a plate.

* * * * *